United States Patent Office 3,123,139
Patented Mar. 3, 1964

3,123,139
OIL WELL WATERFLOODING
Francis R. Conley, Martin Felsenthal, George J. Heuer, Jr., and Carroll F. Knutson, Ponca City, Okla., assignors to Continental Oil Company, Ponca City, Okla., a corporation of Delaware
No Drawing. Filed Feb. 16, 1961, Ser. No. 89,656
7 Claims. (Cl. 166—42)

This invention, briefly, relates to an improved waterflooding process. More particularly, it pertains to a method for preventing the swelling of water sensitive formations, and in another involved aspect is related to a method for improving water injection rates during waterflooding; and thus the same may be considered as being directed in part toward reducing and preventing swelling of natural geological earth formations and the consequent reduction of permeability occasioned by contact of said formations with injected water.

During the secondary recovery of oil from subterranean oil-containing formations, it is common practice to flood such formations by injecting fresh or nonsaline water into the formations through an injection well traversing said formation in order to drive the oil from the formations to producing wells spaced from the injection well. Where the formations contain materials capable of ion exchange generally comprising the clay materials such as montmorillonite, saponite, hectorite, sauconite, kaolinite, etc., contact with fresh water causes the clay to swell with resultant reduction in the permeability of the formation and consequent interference with the waterflooding operation because of inability to inject the water at any practical rate.

Among the various methods for improving waterflooding processes employed by the prior art, has been the use of various surface active agents in order to improve the sweep efficiency of the water drive and thus to prevent fingering and the like. Others have suggested treating formations with chemicals to inhibit the swelling of the formations such as the n-alkyl substituted cycloamines; however, the former in no way reduces swelling, while the latter are employed to reduce formation swelling. Others have employed silicon compounds, but have experienced plugging when compositions of silicon compounds structurally similar to those herein employed have been injected into formations, reducing the permeability even further.

It is therefore an object of this invention to provide an improved waterflooding process whereby improved injection rates are achieved through providing for preventing or mitigating swelling of the clay containing substances and the like and to do the same with silicon compounds. These and other objects will become apparent from the following description.

Briefly, the objects of the invention are accomplished by injecting into the formations containing water at approximately the irreducible water level a solution comprising a hydrolyzable silane in a silane-miscible liquid carrier, injecting a slug of a sweeping agent for said silane comprising a fluid miscible with said carrier for said silane, and finally injecting water under waterflooding conditions.

Other varying and preferred embodiments may be briefly described as will be found immediately hereinafter.

As a precautionary measure and in a preferred embodiment, the formation is first swept with an oil-miscible water sweep to reduce the water to approximately the irreducible water level; and then the solution comprising a hydrolyzable silane in a silane-miscible liquid carrier is injected, followed by a silane sweeping agent and then waterflooding of the formation.

A more preferred embodiment comprises the additional step of injection of a mutually oil and water-miscible sweeping agent, and the same is injected after the silane sweeping agent and before initiating water injection to waterflood the treated formation.

In the case of formations known to possess water above the irreducible water level for an extended period, for example, wherein a waterflood has been conducted on the formation before treatment, a dehydrating agent is first injected to decrease the water saturation contained in the pores of the formation; preferably this is followed by a mutually oil and water-miscible sweeping agent injected as a buffer; this is also preferably followed by an oil-miscible water sweeping agent; then the injection of a hydrolyzable silane in a carrier and those steps subsequent thereto in any of the preceding embodiments are carried out. The mutually oil and water-miscible sweep and the oil-miscible water sweep are steps forming a preferred embodiment of treatment in the case of formations, say, having a waterflood history. However, both steps are not required, as either of them can be omitted providing the other is retained.

The water sweep which is an oil-miscible fluid preferably is injected to insure that the formation water level is reduced to the irreducible level and is always employed where the water level is above this desired level and yet where water injection rates are nevertheless acceptable thereby avoiding the necessity for the dehydrating agent or preshrinking operation. This water sweep also serves to "clean" the formation for and prior to the silane injection to insure readily available contact with the formation material by the silane subsequent to the silane coming into contact with the water in the formation remaining after the water sweep; said water so remaining and reacting with the silane is the water which is below the irreducible water level. Reduction of the water level by the foregoing described procedure besides cleaning the formation also helps to avoid the possibility of hydrolysis of any excessive amount of silane in any one area, pore, or localized plurality thereof and would, if allowed to occur, result in precipitation of a silica compound which would tend to plug the formation and would accordingly reduce the water permeability. As is well known in the art, the reduction of the water level to the irreducible water level involves the employment of an oil-miscible fluid.

Having thus briefly described varying and preferred embodiments and some aspects of the invention, it is perhaps desirable to enumerate some of the advantageous compounds to be employed in our invention before proceeding with additional discussion of the process features.

The following are illustrative of the known group of oil-miscible water sweeping agents and comprise: crudes, kerosene, diesel oil, benzene, jet fuel and hydrocarbons and mixtures thereof in general and which are liquid at conditions employed.

The hydrolyzable silanes contemplated in the present invention have the generic formula of $R_{(4-x)}-Si-R'_x$, wherein R represents a radical which is inert to water, the charged solvents of carrier, crude oil present within the formation; illustratively mentioned are alkyl radicals of 1 to 20 carbons, aryl, alkaryl, aralkyl, cycloalkyl, hydroxyl, and amino radicals, a nitro ($NO_2$), a thio (SH) or a sulfur dioxide ($SO_2$) group. Preferably R is an alkyl radical of 1 to 20 carbons. Specific illustrative examples of the organic radicals contemplated are methyl, ethyl, vinyl, propyl, 2-methyl propyl, butyl, 1-pentenyl, 3-methyl pentene, hexyl, heptyl, octyl, nonyl, decyl, dodecyl, 4-dodecenyl, hexadecyl, 5-ethyldodecyl, eicosyl, phenyl, benzyl, ethylphenyl, butylphenyl, hexphenyl, 3-phenylpropyl, 5-phenylpentyl, cyclohexyl, cyclooctyl, cyclodecyl, methylcyclohexyl, cyclohexenyl, ethylcyclohexyl; R' represents preferably chlorine, but also an ester group which in the present case amount to an oxy radical, or any other readily hydrolyzable group; $x$ equals an integer varying from 1 through 3 and preferably equals 1. Illustratively mentioned as examples of the oxy radicals in the above formula are alkoxy radicals of 1 to 20 carbons, aryloxy, alkaryloxy, aralkoxy and cyclooxy radicals. Specific illustrative examples of these are methoxy, ethoxy, vinyloxy, propoxy, 2-methylpropoxy, butoxy, pentoxy, hexoxy, heptyloxy, nonyloxy, decoxy, dodecoxy, hexadecyloxy, eicosyloxy, phenoxy, benzoxy, butylphenyloxy, hexylphenyloxy, 3-phenylpropoxy, 5-phenylpentoxy, cyclohexoxy and methylcyclohexoxy. The following compounds were actually tested and remonstrated to be suitable compounds conforming to the above formula and constitute illustrative but nonlimiting examples of suitable compounds. These compounds are as follows:

vinyl trichlorosilane
ethyl triepoxysilane
vinyl triepoxysilane
amyl triepoxysilane
methyl trichlorosilane
mixtures of the methyl chlorosilanes
methyl dichlorosilane
methyl monochlorosilane
amyl trichlorosilane
amyl dichlorosilane
amyl monochlorosilane In addition to these were the compounds available commercially under the names Carbide A172 silicon, Union Carbide Y2112 silane ester, and Union Carbide Y2111 silane ester.

The silane-miscible liquid carrier employed for injection of the hydrolyzable silane need only be an inert, nonaqueous organic liquid, miscible with the silane, and includes compounds such as most crude oils, mineral oils, kerosene, gasoline, diesel oil, jet fuel, naphtha, benzene, esters, ketones, ethers, and a pure paraffin fraction and mixtures thereof. The preferred carriers for the silane are the various hydrocarbons and mixtures and most preferred, the crude oils when possible. The primary reason for these being preferred is to employ a carrier which contains a minimal amount of water and is not hygroscopic to substantially prevent hydrolysis of the silane until the same is spread throughout the formation. Some of the silanes do not hydrolyze rapidly, making it possible to use these silanes with esters, ketones and ethers as carriers. However, such carriers and the slowly hydrolyzing silanes are more expensive, thus accounting for their being lesser preferred materials and why they must not be regarded as complete equivalents.

The silane sweeping agent, which is injected after the hydrolyzable silane solution, is an organic compound miscible with the silane carrier fluid and when injected spreads or thins the hydrolyzable silane in a thin coating through an area or zone surrounding the injection well until depletion of the silane is so accomplished within the formation. Very often preferably and advantageously the water sweeping agent, the silane sweeping agent and the liquid carrier for the hydrolyzable silane are the same compound, which provides for a convenient commercial embodiment of the invention to follow. In actual commercial practice of the invention, it will be found more convenient to inject a continuous stream of one or a mixture of the various ingredients to be employed rather than to inject separate distinct slugs of the various materials in the steps of the process. Thus, the formation may be first injected from a typical oil well service company's pumping truck with a water sweep which in this case is an inert silane miscible fluid. The silane is gradually turned in in increasing amounts until the stream is approximately a 1 percent to about a 50 percent mixture of silane and carrier, and thereafter the hydrolyzable silane compound is gradually turned out and the amount of such in the stream gradually reduced until the stream injected comprises the original inert silane miscible fluid as a silane sweep and the flow is continued to sweep the previously injected silane throughout the formation. Such preferred procedure can be seen to be that employed in the detailed example hereinafter.

As has become apparent from the foregoing discussion of this invention, it is a very important part of this invention that the formations to be treated contain approximately an irreducible amount of water, that is, the formations contain "connate water" as referred to by some. However, because of the fact that there is disagreement as to the connotation of such term, we define irreducible water level as that amount of water within a formation which is retained even when the formation is wept by an oil-miscible fluid as a water sweep. Some water is retained in spite of this water sweep because of the surface tension, capillary action, and the like of the water in the formation pores. This normally amounts to about 15 to 40 pore volume percent of water in the strata, depending on the actual composition of the strata and porosity. We might point out here that the injection of an inert oil-miscible liquid prior to injection of the hydrolyzable silane sweeps the formation free of a sufficient portion of water above the irreducible water level in cases of formations containing water in excess of the irreducible level, even though they have not had a waterflood history, and thereby reduces the water level to that desired. Such step constitutes a preferred embodiment of the invention to be practiced in all cases.

Further, in connection with the irreducible amount of water, it is pointed out that formations having previously been waterflooded prior to the treatment with this invention will contain more than an irreducible amount of water; consequently formations having a waterflood history and which have incurred formation swelling require a pre-shinking to increase permeability before treatment. This is not to say, however, that such formations cannot be treated according to the present invention and with consistently desirable and advantageous results; however, in the case of formations having a waterflood history, the formations do first require treatment with a dehydrating agent to reduce the clay swelling, thereby increasing the formation permeability to water; and a following water sweeping agent is then able and does reduce the water level to the irreducible level.

The mutually oil and water-miscible sweeps injected either prior to or subsequent to the silane injection is in all cases a solubilizing agent and in some cases operates also as a buffer. As a buffer, the oil and water-miscible sweep clears the dehydrating agent from that portion of the formation which is to be treated with the hydrolyzable silane and renders it more readily wettable by the silane carrier and improves the efficiency of any oil-miscible water sweep that may also be employed. When the same is injected after the silane, the oil and water-miscible sweep helps to render the formation water wettable by the waterflood which would otherwise immediately follow the buffering and sweeping oily silane sweep. Suitable mutually oil and miscible sweeping agents include the ketones, alcohols, some ethers and preferably is isopropyl or tertiary-butyl alcohol.

As dehydrating agents mentioned above to be employed for the shrinkage of clays which have swelled due to contact with water such as in cases of formations having previously been water-flooded, we contemplate illustrative examples comprising the mineral acids, amines and concentrated salt solutions. Preferably a 5 to 100 percent concentration solution of a mineral acid is employed, and most preferably a 15 percent concentration of an HCl solution is employed. The latter is normally available in the field. Inasmuch as such solutions tend to cause severe corrosion of the oil well casing, tubing, and other such equipment associated with an oil well and servicing thereof such as injection pumps; the inhibitors normally employed with such compounds are naturally to be employed in the present case. Corrosion inhibitors for mineral acids such as HCl are the well known arsenic compound $AsCl_3$ and various commercial amine inhibitors. Of course, any other of the well known suitable inhibitors may be employed. Upon employment of the dehydrating agent and the slug of inert oil-miscible water sweep, and/or the mutually oil and water-miscible sweep subsequent to the injection of the dehydrating agent all with the purpose of shrinking the formation and reduce the water level in the formation to the irreducible water level; those formations having a waterflood history are thereafter to be treated in the same fashion as those not having such a history.

All of the various sweeping agents employed in this invention must be substantially chemically inert to each other, the hydrolyzable silane, the silane carrier, the dehydrating agent, water and the in-place crude.

The quantities of each sweep to be employed can be readily determined by those skilled in the art, it not being critical in any case except that in the case of the silane sweep it must be sufficient to spread it completely; and thus quantities are readily determined based on the amount of silane employed, which amount is based on economic considerations. The formation desired to be treated is that between a water injection well and an output or production well. Due to the cost of materials, it is in most cases found economically advantageous to silane treat the formation for a portion of the distance between injection and output wells, depending also on the distances therebetween. It follows naturally that at least the same portion of the formation to be silane treated is shrunk by a dehydrating agent in those cases where formation shrinkage is desirable.

It is obvious that many variations may be made in the compounds and processes of this invention without departing from the spirit and scope thereof as defined in the appended claims.

*Example*

At a well located at Ventura, California, which had been previously waterflooded, resulting in reduced permeability due to formation swelling therefrom, surface treating equipment was accumulated for treatment thereof. In brief, the surface treating equipment consisted of a semi-trailer containing isopropyl alcohol, two vacuum trucks holding diesel oil, and a hot oil pump truck, the procedure used was as follows:

One vacuum truck pumped diesel oil from the other and leveled off at 35 barrels. Five drums of silane were lined up and drawn off by vacuum to the 35 barrels of diesel oil. The vacuum truck then was driven back and forth for about 5 minutes to thoroughly mix the silane and oil. The two vacuum trucks and the trailer were manifolded to the pump truck's intake, and the alcohol was started into the hole (on top of 1,000 gallons of 15 percent inhibited HCl that had been pumped in the night before). Seventeen barrels of the alcohol went in on vacuum, and the remaining eight barrels of this initial alcohol slug went away at a rate of 555 barrels per day at a surface pressure of 2,000 pounds per square inch. A 10-barrel diesel oil slug was pumped away next. This went in at a rate of 555 barrels per day at 2,000 p.s.i. wellhead pressure. The 40-barrel diesel oil-silane mixture prepared above was pumped in at a rate of 565 barrels per day at 2,800 p.s.i. wellhead pressure. A 5-barrel diesel oil slug was used to chase the silane mixture. This went away at a rate of 490 barrels a day with a surface pressure of 2,800 p.s.i. The final treating phase consisted of a 7-barrel alcohol slug which went in at 490 barrels per day at 2,800 p.s.i. on the wellhead. Upon completion of the above procedure, the water was started into the well right after the final alcohol slug. (It may be found advantageous on occasion to wait for a period of 24 hours or even longer after treating before instituting waterflooding.) The initial rate was 150 barrels per day at a surface pressure of 2,000 p.s.i. During 19 hours of water injection after treatment, the rate increased to 360 barrels per day at approximately 1,800 p.s.i. We have thus described the invention with particularity for illustrative purposes.

While particular embodiments of the invention have been described, it will be understood, of course, that the invention is not limited thereto, since many modifications may be made; and it is therefore contemplated to cover by the appended claims any such modifications as fall within the true spirit and scope of the invention.

The invention having thus been described, what is claimed and desired to be secured by Letters Patent is:

1. An improved water flooding process providing for an increase in and prolongation of high water injection rates comprising, injecting a dehydrating agent into a formation to be waterflooded and which contains a water level substantially above the irreducible water level, injecting a slug of an oil-miscible water sweeping agent, injecting a solution of a hydrolyzable silane in an inert silane-miscible liquid carrier, injecting a sweeping agent for said silane comprising an inert fluid miscible with said silane carrier, injecting a mutually oil and water-miscible sweeping agent, and finally injecting water under waterflooding conditions.

2. An improved waterflooding process providing for increased and prolongation of high water injection rates comprising, injecting a dehydrating agent into a formation having previously been water flooded and containing a water level substantially above the irreducible water level, injecting a slug of an oil-miscible water sweeping agent, injecting a slug of a hydrolyzable silane in an inert silane miscible liquid carrier, injecting a sweeping agent for said silane comprising a fluid miscible with said silane carrier, injecting a mutually oil and water miscible sweeping agent, and finally injecting water under water-flooding conditions.

3. An improved waterflooding process providing for increased and prolongation of higher water injection rate comprising, injecting a slug of a dehydrating agent into a formation having previously been waterflooded and containing a water level substantially above the irreducible water level, injecting a slug of a first mutually oil and water-miscible sweeping agent, injecting a slug of an inert oil-miscible water sweeping agent, injecting a slug of a hydrolyzable silane and an inert liquid carrier, injecting a slug of sweeping agent for said silane comprising an inert fluid miscible with said silane carrier, injecting a second mutually oil and water-miscible sweeping agent, and finally injecting water under waterflooding conditions.

4. A process according to claim 2 wherein the dehydrating agent is a concentrated mineral acid solution and wherein the mutually oil and water-miscible sweeping agent is selected from the group consisting of isopropyl and tertiary butyl alcohol, wherein the oil-miscible water sweep injected before the silane is a crude oil, wherein the hydrolyzable silane is a chlorosilane having the formula $R_{(4-x)}$—Si—$R'_x$, wherein R represents an alkyl radical of 1 to 20 carbons, R' represents a chlorine atom and $x$ is an integer varying from 1 to 3 inclusively, wherein the silane carrier is a crude oil and wherein the silane sweeping agent is also a crude oil.

5. A process according to claim 3 wherein the dehydrating agent is a concentrated HCl solution and wherein the first mutually oil and water-miscible sweeping agent is selected from the group consisting of isopropyl and tertiary butyl alcohol, wherein the oil-miscible water sweep injected before the silane is a crude oil, wherein the hydrolyzable silane is a chlorosilane having the formula $R_{(4-x)}$—Si—$R'_x$, wherein R represents an alkyl radical of 1 to 20 carbons, R' represents a chlorine atom, and $x$ is an integer varying from 1 to 3 inclusively wherein the silane carrier is a crude oil, wherein the silane sweeping agent is a crude oil and wherein the second mutually oil and water-miscible sweeping agent is selected from the group consisting of isopropyl and tertiary butyl alcohol.

6. A process according to claim 5 wherein the silane selected is one having the formula according to therein in which $x$ is equal to 1.

7. An improved water-flooding method providing for reduction in the swelling of subterranean formations to be water flooded and which exhibit a swelling reaction to injected water, comprising injecting into said formations to reduce the water to the irreducible water level an oil-miscible water sweeping agent and injecting into said formation having the water level so reduced to the irreducible level, a solution comprising a hydrolyzable silane in an inert silane-miscible carrier followed by an injection of a sweeping agent for said silane comprising an inert fluid miscible with said silane carrier, injecting a mutually oil and water-miscible sweep and finally injecting water under water-flooding conditions.

References Cited in the file of this patent

UNITED STATES PATENTS

| | | |
|---|---|---|
| 2,469,354 | Bond | May 10, 1949 |
| 2,614,635 | Williams et al. | Oct. 21, 1952 |
| 2,633,919 | Bauer et al. | Apr. 7, 1953 |
| 2,846,012 | Lorenz et al. | Aug. 5, 1958 |
| 3,036,630 | Bernard et al. | May 29, 1962 |